United States Patent [19]

Tsurushige et al.

[11] 4,226,943
[45] Oct. 7, 1980

[54] FOAMABLE COMPOSITION OF VINYL CHLORIDE POLYMERS AND METHOD OF PRODUCING OPEN CELL SHEET

[75] Inventors: Normitsu Tsurushige; Toshinori Takao; Shinichi Yamada, all of Naruto, Japan

[73] Assignee: Otsuka Kagaku Yakuhin Kabushiki Kaisha, Japan

[21] Appl. No.: 962,708

[22] Filed: Nov. 21, 1978

[51] Int. Cl.$^2$ .................................................. C08J 9/10
[52] U.S. Cl. ...................... 521/73; 427/373; 521/75; 521/145
[58] Field of Search ...................... 521/73, 75; 427/373

[56] References Cited

U.S. PATENT DOCUMENTS

| | | | |
|---|---|---|---|
| 2,744,075 | 5/1956 | Roberts | 521/73 |
| 3,444,281 | 5/1969 | Cahill et al. | 521/75 |
| 3,536,638 | 10/1970 | Dosman | 521/75 |
| 3,695,477 | 10/1972 | Edmonston | 521/75 |
| 3,708,441 | 2/1973 | Joslyn et al. | 521/75 |
| 3,928,704 | 12/1975 | Heidingsfeld et al. | 521/73 |

FOREIGN PATENT DOCUMENTS 53-21898 of 1978 Japan ......................................... 521/75

*Primary Examiner*—Morton Foelak
*Attorney, Agent, or Firm*—Armstrong, Nikaido, Marmelstein & Kubovcik

[57] ABSTRACT

This invention provides a foamable composition of vinyl chloride polymers comprising a vinyl chloride polymer, a plasticizer, a synthetic hydrocarbon wax, an alkali metal-zinc stabilizer and a decomposable organic blowing agent; and a method of producing an open cell sheet of vinyl chloride polymers comprising shaping the foamable composition into a sheet-like body and heating the resulting shaped body.

13 Claims, No Drawings

FOAMABLE COMPOSITION OF VINYL CHLORIDE POLYMERS AND METHOD OF PRODUCING OPEN CELL SHEET

This invention relates to a novel foamable composition of vinyl chloride polymers and to a method for producing an open cell sheet of vinyl chloride polymers having open cells uniformly dispersed therein.

Methods have heretofore been known for producing an open cell sheet of vinyl chloride polymers for use as a leather cloth and a backing material for fibrous fabrics as in carpets. For example, U.S. Pat. No. 3,536,638 discloses a method comprising the steps of dispersing in a vinyl chloride polymer plastisol a powdered polyethylene having a bulk density less than its actual density and a melting point higher than the gel temperature of said plastisol, applying the resulting dispersion onto a base substrate as by means of a reverse roll coater, etc. to form a sheet, heating the sheet first to gel the resin and plasticizer and then heating the sheet further to melt the powdered polyethylene and to completely fuse the resin and plasticizer. This method is economically and commercially advantageous in that the polyvinyl chloride resin can be rendered permeable to air at a relatively low cost, whereas the method has the drawback that the resulting composition has poor stability because the polyethylene powder which is incompatible with the vinyl chloride polymer is used in a large amount of 10 to 60 parts by weight per 100 parts by weight of the latter. Stated more specifically use of the polyethylene gives the composition a high viscosity, which further increases rapidly with the lapse of time. Consequently difficulty is encountered in applying the composition to substrates with a doctor knife coater or reverse roll coater. Additionally the composition tends to undergo phase separation, which may be eliminated by stirring but air bubbles would then be incorporated into the composition, giving a defective open cell sheet. When a composition involving phase separation is used, the resulting sheet will not have open cells as uniformly distributed therein, failing to have uniform air permeability over the entire area of the sheet and satisfactory strength.

Another method is also known by which open cell sheets are prepared from a composition comprising a mixture of a vinyl chloride emulsion polymer, a plasticizer and a blowing agent and at least one wax admixed with the mixture and substantially incompatible with the vinyl chloride polymer, the wax being selected from the group consisting of paraffin wax having 20 to 80 carbon atoms and wax having 20 to 80 carbon atoms and comprising a mono- or poly-hydric alcohol ester of a higher aliphatic monobasic acid (Published Examined Japanese Patent Application No. 21898/1978). The composition is shaped into a sheet, which is then heated to obtain an open cell product. The wax incompatible with the vinyl chloride polymer is used in a small amount of 3 to 15 parts by weight per 100 parts by weight of the vinyl chloride polymer, so that the method is advantageous over the method of U.S. Pat. No. 3,536,638 in that the composition obtained has a substantially lower viscosity, is almost free of phase separation and gives open cell sheets having satisfactory strength. However, this method, when actually practiced, failed to produce open cell sheets of good air permeability steadily at all times unless the wax was used in an increased amount of 10 to 15 parts by weight. When containing less than 10 parts by weight of the wax, the composition, although stable and free of phase separation, gave open cell sheets whose air permeability varied batchwise, thus affording a batch of fully air-permeable sheets while providing another batch of sheets with insufficient air permeability. Accordingly there was the necessity of using at least 10 parts by weight of the wax to produce sheets of constant air permeability at all times by the method, with the result that it was impossible to completely overcome the drawback that the composition would become unusable due to an increase in viscosity or phase separation during operation, necessitating restirring and subsequent debubbling for the remedy of the phase separation.

Thus it has heretofore been essential to use a substance, such as polyethylene or wax, which is incompatible with vinyl chloride resin in assuring the desired air permeability of the product. This renders the composition unstable, frequently resulting in a markedly increased viscosity or phase separation and entailing the need of restirring and debubbling to eliminate the phase separation. Because of these objections, the known methods are not always adapted for efficient operation.

An object of this invention is to provide stable foamable compositions of vinyl chloride polymers which do not show marked increase in viscosity with a lapse of time and are free of phase separation.

Another object of this invention is to provide foamable vinyl chloride polymer compositions in which a substance substantially incompatible with vinyl chloride polymers is contained in a small amount of less than 10 parts by weight per 100 parts by weight of the polymers and which nevertheless are capable of giving open cell sheets of vinyl chloride polymers having high and uniform air permeability, including open cells as uniformly distributed therein and possessing high strength.

Another object of this invention is to provide a method of producing open cell sheets of vinyl chloride polymers without involving the foregoing drawbacks of conventional methods.

Still another object of this invention is to provide a method for producing an open cell sheet of vinyl chloride polymers which has open cells uniformly distributed therein and which is high in air permeability and strength.

Other objects and features of this invention will become apparent from the following description.

The foamable composition of vinyl chloride polymer of this invention comprises 100 parts by weight of a vinyl chloride polymer, 30 to 150 parts by weight of a plasticizer, 1 to 8 parts by weight of a straight-chain or branched-chain synthetic hydrocarbon wax having a molecular weight of 1,500 to 7,000, a softening point of 90° to 135° C. and an average particle size of 10 to 100 $\mu$m, 1 to 5 parts by weight of an alkali metal-zinc stabilizer, and 2 to 10 parts by weight of a decomposable organic blowing agent containing azodicarbonamide.

Our research has revealed that when a composition prepared by adding 1 to 8 parts by weight of a specific synthetic hydrocarbon wax, 1 to 5 parts by weight of a stabilizer and 2 to 10 parts by weight of a blowing agent containing azodicarbonamide, per 100 parts by weight of a vinyl chloride polymer to an externally plasticized vinyl chloride polymer is shaped into a sheet-like form and then heated to a temperature of at least a gel point of the externally plasticized vinyl chloride polymer, a foamed sheet of vinyl chloride polymer can be formed with open cells uniformly distributed therein and the resultant sheet is excellent in air permeability and high in strength. The composition does not show a marked increase in viscosity and phase separation and other objections attendant thereon. The foamable composition of this invention is further advantageous over like conventional compositions in that it is foamable at a high velocity and gives a product excellent in hygroscopicity and elasticity and having very uniform minute cells and good whiteness.

The reason why the present composition has the outstanding effects described above, although still remaining to be fully clarified, appears to be as follows. The synthetic hydrocarbon wax, which is substantially incompatible with vinyl chloride polymer, can be uniformly dispersed in the composition, so that when the composition is heated to the gelling temperature of the vinyl chloride polymer or higher, the hydrocarbon wax melts, forming a molten layer. At the same time, the blowing agent heated gives off a gas, which is released from the system through the molten layer, thus forming open cells. These open cells can be formed very efficiently in the presence of a specified amount of the stabilizer. The desired result is therefore achievable with use of a reduced amount of 1 to 8 parts by weight of the hydrocarbon wax for forming the molten layer. This renders the composition usable without involving the objections heretofore encountered such as an increase in the rate of rise in its viscosity, phase separation, etc. Thus the effects described are attainable only with the use of predetermined amounts of the specified hydrocarbon wax, specified stabilizer and specified blowing agent. In fact, the remarkable effects of this invention will not result if any one of these three components is not used, or when one of them is used in an amount other than is specified, or when one of them used is not the specified compound.

The vinyl chloride polymers to be used in this invention are those having a particle size of about 0.1 to 10 $\mu$m preferably 0.2 to 2 $\mu$m and usually prepared by emulsion polymerization of vinyl chloride. The vinyl chloride polymer include a homopolymer of vinyl chloride and copolymers of vinyl chloride with other polymerizable monomers such as vinyl chloride-vinyl acetate copolymer, vinyl chloride-vinylidene chloride copolymer, etc. Of these polymers preferable are homopolymer of vinyl chloride and copolymers containing at least 80% by weight of vinyl chloride. They may be used singly or at least two of them may be used in admixture. The above vinyl chloride polymers are fluidized to produce externally plasticized vinyl polymer having a gel point of 150° to 250° C. when a plasticizer is incorporated therein. On the other hand, vinyl chloride polymers having larger particle sizes, for example, those prepared by suspension polymerization are difficult to be fluidized by the addition of plasticizer. Therefore, such suspension polymer can not be used singly in this invention but it may be employed in the form of a mixture with the polymer having a particle size of 0.1 to 10 $\mu$m in an amount of not more than 30% by weight.

However, vinyl chloride polymers which are produced by a microsuspension method have smaller particle sizes and are easily fluidized by the addition of a plasticizer and, therefore, may be used singly in the same manner as the polymers produced by emulsion polymerization.

According to this invention, a wide variety of known plasticizers are used which include, for example, phthalates, adipates, sebacates, azelates, phosphates, etc. Preferable plasticizers are di(2-ethylhexyl) phthalate, di-n-octyl phthalate, dibutyl phthalate, butylbenzyl phthalate, dihexyl phthalate, diallyl phthalate, di(2-ethylhexyl) adipate, octyldecyl adipate, diisooctyl adipate, diisooctyl sebacate, di(2-ethylhexyl) sebacate, di-isooctyl azelate, di(2-ethylhexyl) azelate, di-n-octyl azelate, tricresyl phosphate, trioctyl phosphate, alkylepoxy stearate, etc.

Usually, these plasticizers are used singly, but where desired, at least two of them may be used conjointly. The amount of the plasticizer used varies with the kind of vinyl chloride polymer, the desired viscosity of the composition and the like. Generally it is 30 to 150 parts by weight, preferably 50 to 100 parts by weight, per 100 parts by weight of the vinyl chloride polymer.

The synthetic hydrocarbon waxes useful in this invention are those having a molecular weight of 1,500 to 7,000, a softening point of 90° to 135° C. and an average particle size of 10 to 100 $\mu$m. These hydrocarbon waxes are all synthetic products entirely different in molecular weight and softening point from paraffin wax, microcrystalline wax, etc. separated from petroleum fractions. For instance, paraffin wax usually has an average molecular weight of about 280 to about 430 (about 20 to about 30 in the number of carbon atoms) and a softening point of about 50° C., and microcrystalline wax has an average molecular weight of about 560 to about 980 (about 40 to about 70 in the number of carbon atoms) and a softening point of about 70 to about 80° C. The synthetic hydrocarbon waxes useful in this invention are entirely distinct from such paraffin wax, microcrystalline wax, etc. in molecular weight and softening point. Suitable synthetic hydrocarbon waxes are those prepared by various methods, e.g. typically by the depolymerization of polyethylene, polymerization of ethylene and the Fischer-Tropsch synthesis of coal gas, and having a molecular weight of 1,500 to 7,000. These waxes are used singly or in mixture. More specific examples of useful synthetic hydrocarbon waxes are those commercially available under the trademarks of Sunwax (product of Sanyo Chemical Industry Co., Ltd., JAPAN), MITSUI Hi-wax (product of Mitsui Petrochemical Co., Ltd., JAPAN), Sasol wax (product of South African Coal Oil & Gas Corp. Ltd., Republic of South Africa), etc. The hydrocarbon wax is used in an amount of 1 to 8 parts by weight, preferably 3 to 7 parts by weight, per 100 parts by weight of the vinyl chloride polymer. With less than 1 part by weight of the wax present, it becomes difficult to form open cells, whereas compositions containing more than 8 parts by weight of the wax are likely to become viscous rapidly or undergo phase separation.

Alkali metal-zinc stabilizers usable in this invention are those consisting predominantly of an organic acid salt of an alkali metal and an organic acid salt of zinc. Advantageously such stabilizers comprise 1 to 7%, preferably 1.4 to 6%, by weight of sodium or potassium, 4 to 12%, preferably 5 to 10%, by weight of zinc and the balance substantially an organic acid residue. Typical of useful organic acid residues are the residues of saturated, unsaturated or cyclic aliphatic acid, aromatic acid, etc. which may contain a hydroxyl group. Examples of saturated aliphatic acids are caproic acid, capric acid, lauric acid, palmitic acid, stearic acid, 2-ethylhexanoic acid, etc. Examples of unsaturated aliphatic acids are oleic acid, linoleic acid, linolenic acid, etc. Exemplary of cyclic aliphatic acids are naphthenic acid. Ricinoleic acid, hydroxystearic acid are also useful. Examples of aromatic acids are phthalic acid, benzoic acid, salicylic acid, etc. These alkali metal-zinc stabilizers are usable singly, or at least two of them can be used in mixture. The stabilizer is used in an amount of 1 to 5 parts by weight, preferably 1.5 to 3.5 parts by weight, per 100 parts by weight of the vinyl chloride polymer. When used in an amount of less than 1 part by weight, the stabilizer will not act favorably for the formation of open cells, further failing to stabilize the vinyl chloride polymer as intended, whereas use of more than 5 parts by weight of the stabilizer is not economical and may possibly fail to produce the advantageous effects.

The blowing agents to be used according to this invention are known organic compounds which undergo decomposition when heated to a temperature of 150° to 230° C. to give off $N_2$ and/or $CO_2$ gas. Examples of useful organic blowing agents are azodicarbonamide and mixtures of azodicarbonamide and various other organic blowing agents, examples of which are N,N'-dinitrosopentamethylenetetramine, p-toluenesulfonylhyrazide, p,p'-oxybis(benzenesulfonylhydrazide), p-toluenesulfonylsemicarbazide, etc. These organic blowing agents may be used singly or at least two of them are usable conjointly, as admixed with azodicarbonamide. Azodicarbonamide, when used in the form of a mixture, should be contained in an amount of at least about 60% by weight of the total amount of the blowing agent mixture. Use of less than 60% by weight of azodicarfonamide will not afford the desired effects. The blowing agent is used in an amount of about 2 to 10 parts by weight, preferably about 2.5 to 5 parts by weight, per 100 parts by weight of the vinyl chloride polymer.

The foamable composition of vinyl chloride polymer according to this invention is prepared by uniformly mixing together the foregoing vinyl chloride polymer, plasticizer, synthetic hydrocarbon wax, stabilizer and blowing agent. The viscosity of the composition can be varied fairly greatly in accordance with the kinds of the vinyl chloride polymer and plasticizer, the amount of plasticizer, etc. However, to facilitate application to a base substrate prior to gelation, it is generally preferable that the composition have a viscosity of about 1,000 to 10,000 cps., more preferably about 3,000 to 8,000 cps. Insofar as the amount of the plasticizer relative to the vinyl chloride polymer is within the specified range described, the viscosity of the composition obtained according to this invention will generally be within the foregoing range. Moreover the foamable composition of vinyl chloride polymers of this invention has extremely high stability, retains substantially the same rate of viscosity increase as when the synthetic hydrocarbon wax and stabilizer are not incorporated therein with the lapse of time, and undergoes no phase separation whatever.

The foamable composition of vinyl chloride polymer according to this invention may further incorporate therein a filler and various like substances which are conventionally known as additives for polyvinyl chloride. Examples of the filler are calcium carbonate, clay, talc, silica, magnesium carbonate, carbon black, wood flour, etc. Usually, the filler is used in an amount of up to 100 parts by weight, preferably not more than 50 parts by weight, per 100 parts by weight of the vinyl chloride polymer.

To make the present composition into an open cell sheet of vinyl chloride polymer according to this invention, the present composition is shaped into a sheet-like form and the shaped composition is then heated to gel and foam the composition. In shaping the composition into a sheet-like form it is preferable to apply the composition to a base substrate so as to produce a uniform coating layer on the substrate. The coated substrate thus obtained is then objected to heat treatment to produce an open cell sheet. The open cell sheet obtained by this method comprises a base substrate and a foamed layer formed on the substrate and having open cells uniformly dispersed therein. It can be used as it is or in the form of foamed layer per se obtained by stripping the foamed layer off the base substrate in accordance with the use of the open cell sheet. The base substrates to be used include, for example, woven fabrics, non-woven fabrics, knitted fabrics, plate, sheet, paper, film or the like made of various natural or synthetic materials. The present composition can be applied to a base substrate by various coating methods conventional in the art, for example, by roll coating, knife coating or the like. If it is required to strip the foamed layer off the base substrate, a release agent such as silicone oil, varnish, etc. may be applied to the base substrate so as to facilitate the release of the foamed layer from the base substrate. The composition can be applied to the base substrate to varying thickness as desired, usually to about 0.1 to 2 mm, preferably 0.15 to 1 mm. The thickness of the coating is in no way limitative and may exceed 2 mm. The heating temperature is not lower than the temperature at which the blowing agent starts decomposition in the coating layer. The heating temperature is usually in the range of 150° to 250° C., preferably 180° to 230° C. When heated, the synthetic hydrocarbon wax melts and the blowing agent decomposes efficiently and vigorously in the presence of the alkali metal-zinc stabilizer while the vinyl chloride polymer gels, whereby open cells are formed rapidly as uniformly distributed throughout the resulting product.

The open cell sheet of vinyl chloride polymer of this invention thus obtained generally has a thickness of about 2.5 to 5 times the original thickness of the sheet before foaming.

The open cell sheet of this invention is excellent in elasticity, in hygroscopicity, in air permeability and in strength and is therefore very useful as a leather cloth, a backing material for fibrous fabrics such as carpets, etc.

To clarify the features of this invention, examples and comparison examples are given below in which the parts are all by weight.

In the examples, the physical characteristics are determined as follows.

(1) Viscosity is measured in accordance with JIS K-6838 by a B-type viscosimeter, product of Tokyo Keiki Co., Ltd., Japan.

(2) Air permeability is measured in accordance with JIS L-1004 by an air permeability tester of the Fragile type, product of Toyo Seiki Mfg. Co., Ltd., Japan.

(3) Blowing ratio is given by the following equation.

$$\text{Blowing ratio} = \frac{\text{Thickness (mm) of foamed layer}}{\text{Thickness (mm) of gelled layer on base substrate}}$$

(4) Tensile strength is determined in accordance with JIS K-6767, Method A.

(5) Coating properties are evaluated by sensory test with use of a doctor knife test device.

(6) State of cells is evaluated by sensory test in which a section of foamed layer is observed with the unaided eye and a magnifying glass with respect to the uniformity in size and distribution of cells.

EXAMPLES 1 to 4

A vinyl chloride homopolymer (PVC) prepared by emulsion polymerization and having an average polymerization degree of 1,300, dioctyl phthalate (DOP), wax, Na-Zn stabilizer and azodicarbonamide (ADCA) are fully mixed together by a mixer in the proportions listed in Table 1 below to prepare foamable Compositions 1 to 4 of vinyl chloride polymer according to this invention.

The wax is a synthetic hydrocarbon wax having an average molecular weight of 3,000, a softening point of 106° C. as determined by the ring and ball method and an average particle size of 40 μm. The Na-Zn stabilizer contains 2.56% of Na and 5.11% of Zn.

Compositions 1 to 4 thus prepared according to this invention are applied by a roll coater to a thickness of 0.5 mm to pieces of paper coated with silicone resin, and the coated pieces are heated at about 200° C. for 2 minutes to obtain Products 1 to 4 in the form of foamed vinyl chloride polymer sheets according to this invention.

Table 1 also shows the viscosities of Compositions 1 to 4 immediately after preparation and after having been allowed to stand for 1 week and the coating properties thereof.

Table 2 shows the air permeability, blowing ratio, tensile strength and state of cells of Product 1 to 4.

The coating properties and the state of cells are evaluated according to the following criteria:
A: excellent
B: good
C: fair
D: poor

COMPARISON EXAMPLES 1 AND 2

Comparison Composition 1 is prepared in the same manner as in Example 1 without using any wax. Comparison Composition 2 is prepared in the same manner as in Example 1 except that 10 parts by weight of the wax is used. Table 1 shows the viscosities and the coating properties of these compositions.

Table 2 shows various properties of Comparison Products 1 and 2 prepared in the same manner as in Example 1 with use of Comparison Compositions 1 and 2, respectively.

TABLE 1

| Composition | PVC | DOP | wax | stabilizer | ADCA | Viscosity (cps) Initial | Viscosity (cps) 1 week later | Coating properties |
| --- | --- | --- | --- | --- | --- | --- | --- | --- |
| 1 | 100 | 80 | 2 | 3 | 3 | 1,300 | 4,100 | B |
| 2 | 100 | 80 | 4 | 3 | 3 | 1,900 | 6,000 | B |
| 3 | 100 | 80 | 6 | 3 | 3 | 3,000 | 9,800 | B |
| 4 | 100 | 80 | 8 | 3 | 3 | 4,400 | 13,900 | B |
| Comparison Composition | | | | | | | | |
| 1 | 100 | 80 | 0 | 3 | 3 | 1,100 | 3,200 | B |
| 2 | 100 | 80 | 10 | 3 | 3 | 6,700 | 22,500 | C to D |

Table 1 reveals that Compositions 1 to 4 of this invention retain low viscosities even 1 week later and have good coating properties, whereas Comparison Composition 2 has a greatly increased viscosity in 1 week and poor coating properties.

Compositions 1 to 4 of this invention are found to be free of any phase separation when allowed to stand for 1 week after preparation.

TABLE 2

| | Air permeability (cc/cm². sec) | Blowing ratio (times) | Tensile strength (kg/cm²) | State of cells |
| --- | --- | --- | --- | --- |
| Product | | | | |
| 1 | 0.46 | 3.8 | 11.3 | A |
| 2 | 4.50 | 3.9 | 10.4 | A |
| 3 | 7.80 | 3.7 | 9.2 | A |
| 4 | 11.40 | 3.8 | 8.6 | B |
| Comp. Product | | | | |
| 1 | 0.007 | 4.0 | 12.6 | A |
| 2 | 14.80 | 3.7 | 5.3 | C |

As apparent from Table 2, Products 1 to 4 of this invention are excellent in air permeability, blowing ratio, tensile strength and cell state, but Comparison Product 1 has low air permeability. In spite of high air permeability, Comparison Product 2 is inferior in tensile strength and cell state.

EXAMPLES 5 TO 8

Compositions 5 to 8 are prepared according to this invention in the same manner as in Example 1 except that the synthetic hydrocarbon waxes A to D listed in Table 3 below are used.

TABLE 3

| Composition | Wax | Molecular weight | Softening point (°C.) | Particle size (μm) |
| --- | --- | --- | --- | --- |
| 5 | A | 1,500 | 105 | 40 |
| 6 | B | 5,000 | 111 | 40 |
| 7 | C | 3,000 | 106 | 20 |
| 8 | D | 3,000 | 106 | 80 |

Products 5 to 8 are prepared in the same manner as in Example 1 with use of Compositions 5 to 8. Table 5 shows the coating properties thus determined and the cell state and air permeability of the products.

COMPARISON EXAMPLES 3 TO 6

Comparison Compositions 3 to 6 are prepared in the same manner as in Example 1 except that the polyethylene E and waxes F to H listed in Table 4 below are used.

TABLE 4

| Comp. Composition | Wax | Kind | Molecular weight | Softening point (°C.) | Particle size (μm) |
| --- | --- | --- | --- | --- | --- |
| 3 | E | Polyethylene | >50,000 | 110 | 80 |
| 4 | F | Microcrystalline wax | 680 | 75 | 60 |
| 5 | G | Natural paraffin | 250-300 | About | 300 |

TABLE 4-continued

| Comp. Composition | Wax | Kind | Molecular weight | Softening point (°C.) | Particle size (μm) |
|---|---|---|---|---|---|
| 6 | H | wax Ester wax prepared from montanic acid | — | 50 70-74 | 100 |

Table 5 shows the coating properties of Comparison Compositions 3 to 6 and various properties of the sheets prepared in the same manner as in Example 1 with use of these compositions.

TABLE 5

| | Coating properties | State of cells | Air permeability (cc/cm². sec) |
|---|---|---|---|
| Product | | | |
| 5 | A | A | 4.85 |
| 6 | A | A | 3.20 |
| 7 | A | A | 6.10 |
| 8 | B | A | 3.85 |
| Comp. Product | | | |
| 3 | C | C | 0.20 |
| 4 | B | B | 0.24 |
| 5 | B | C | 0.45 |
| 6 | C | C | 0.10 |

Table 5 reveals that Compositions 5 to 8 of this invention have outstanding coating properties and that Products 5 to 8 prepared from these compositions according to this invention are excellent in cell state and have high air permeability. In contrast, Comparison Compositions 3 to 6 are inferior in coating properties, and Comparison Products 3 to 6 prepared therefrom are also inferior in cell state and air permeability. Therefore the use of the specific synthetic hydrocarbon wax according to this invention is essential for the production of a foamable composition of vinyl chloride polymer having excellent coating properties as well as for the production of an open cell sheet excellent in the state of cells and air permeability.

EXAMPLES 9 TO 13

Compositions 9 to 13 are prepared from the following ingredients according to this invention with use of stabilizers I to M having the metal contents listed in Table 6.

| Ingredient | Parts by weight |
|---|---|
| PVC[1] | 100 |
| DOP | 80 |
| DOA | 5 |
| Stabilizer | 3 |
| Wax[2] | 4 |
| ADCA | 3 |

Note:
[1] Vinyl chloride polymer having an average polymerization degree ($\bar{P}$) of 1,300.
[2] The same wax as used in Example 1.

TABLE 6

| | | Metal content (wt. %) | | | | |
|---|---|---|---|---|---|---|
| Composition | Stabilizer | Na | K | Li | Zn | Ba |
| 9 | I | 2.56 | — | 0.07 | 5.11 | 0.01 |
| 10 | J | 1.44 | — | 0.09 | 6.43 | 0.01 |
| 11 | K | 0.03 | 2.17 | 0.02 | 9.27 | 0.01 |
| 12 | L | 0.03 | 1.55 | 0.01 | 5.62 | 0.01 |
| 13 | M | 2.70 | 3.36 | 0.04 | 8.29 | 0.05 |

Compositions 9 to 13 are applied to release paper to a thickness of 0.2 mm gelled at 150° C. for 1 minute and thereafter foamed at 200° C. for 80 seconds to obtain Products 9 to 13 according to this invention. Table 8 shows the air permeability of Products 9 to 13.

COMPARISON EXAMPLES 7 TO 9

Comparison Compositions 7 to 9 are prepared in the same manner as in Examples 9 to 13 except that comparison stabilizers N, P and Q having the metal contents listed in Table 7 are used. Comparison Products 7 to 9 are prepared with use of these compositions. Table 8 shows the air permeability of these products.

TABLE 7

| Comp. composition | Stabilizer | Metal content (wt. %) | | | | | | |
|---|---|---|---|---|---|---|---|---|
| | | Na | K | Li | Zn | Pb | Cd | Ca | Ba |
| 7 | N | 0.25 | — | 0.02 | 6.58 | — | — | — | 3.18 |
| 8 | P | — | — | 6.62 | 2.90 | — | — | 1.53 | 8.65 |
| 9 | Q | 0.01 | 0.81 | 1.07 | 2.82 | 0.03 | 0.01 | 0.34 | 1.57 |

TABLE 8

| | Air permeability (cc/cm². sec) |
|---|---|
| Product | |
| 9 | 5.45 |
| 10 | 4.90 |
| 11 | 7.10 |
| 12 | 4.66 |
| 13 | 8.32 |
| Comp. Product | |
| 7 | 0.14 |
| 8 | 0.01 |
| 9 | 0.21 |

Table 8 shows that it is critical to use a alkali metal-Zn stabilizer comprising 1 to 7% by weight of an alkali metal, 4 to 12% by weight of zinc and the balance substantially an organic acid residue in order to obtain an open cell sheet having excellent air permeability.

EXAMPLES 14 TO 18

The vinyl chloride polymers and plasticizers listed in Table 9 are used in combination to prepare Compositions 14 to 18 of this invention shown in Table 10.

TABLE 9

| Example | PVC | Plasticizer (parts) |
|---|---|---|
| 14 | VC-VAc copolymer[1] | DOP (80) |
| 15 | PVC. Paste Type ($\bar{P}$ = 1650) | DHP[2] (80) |
| 16 | PVC. Paste Type ($\bar{P}$ = 1650) | DOP (60) DBP[3] (20) |
| 17 | PVC. Paste Type ($\bar{P}$ = 1650) | DOP (60) DOA[4] (20) |
| 18 | PVC. Paste Type ($\bar{P}$ = 1650) | DOP (60) DIDP[5] (20) |

Note:
[1] Vinyl chloride-vinyl acetate copolymer containing 5% by weight of vinyl acetate and having an average polymerization degree of 1,200.
[2] DHP stands for di-heptyl phthalate
[3] DBP stands for di-butyl phthalate
[4] DOA stands for di-octyl adipate
[5] DIDP stands for di-iso-decyl-phthalate

TABLE 10

| Composition | PVC | Plasticizer | ADCA | Wax[1] | Stabilizer[2] |
|---|---|---|---|---|---|
| 14 | 100 | 80 | 3 | 4 | 3 |
| 15 | 100 | 80 | 3 | 4 | 3 |
| 16 | 100 | 80 | 3 | 4 | 3 |

TABLE 10-continued

| Composition | PVC | Plasticizer | ADCA | Wax[1] | Stabilizer[2] |
|---|---|---|---|---|---|
| 17 | 100 | 80 | 3 | 4 | 3 |
| 18 | 100 | 80 | 3 | 4 | 3 |

Note:
[1]The same wax as used in Example 1.
[2]The same Na-Zn stabilizer as used in Example 1.

Table 11 shows the air permeability of Products 14 to 18 of the invention prepared in the same manner as in Example 1 with use of Compositions 14 to 18 according to this invention, respectively.

TABLE 11

| Product | Air permeability (cc/cm$^2$ . sec) |
|---|---|
| 14 | 2.45 |
| 15 | 4.24 |
| 16 | 3.98 |
| 17 | 4.90 |
| 18 | 4.62 |

EXAMPLE 19

Composition 19 is prepared according to this invention from the ingredients listed in Table 12. The blowing agent used is a mixture of 2.5 parts by weight of ADCA and 1.5 parts by weight of p,p'-oxy-bis (benzene sulfonyl hydrazide) (p,p'-OBSH). Table 13 shows the air permeability of Product 19 prepared in the same manner as in Example 1 with use of the composition.

COMPARISON EXAMPLE 10

Comparison Composition 10 is prepared in the same manner as in Example 19 except that the blowing agent is a mixture of 1 part by weight of ADCA and 4 parts by weight of p,p'-OBSH. Table 13 also shows the air permeability of Comparison Product 10 prepared in the same manner as in Example 1 with use of the composition.

TABLE 12

| | PVC | DOP | Stabilizer[1] | Wax[2] | Blowing Agent |
|---|---|---|---|---|---|
| Composition 19 | 100 | 80 | 3 | 4 | 4 |
| Comp. Composition 10 | 100 | 80 | 3 | 4 | 5 | table 13

| | Air permeability (cc/cm$^2$ . sec) |
|---|---|
| Product 19 | 2.30 |
| Comp. Product 10 | 0.011 |

Table 13 shows that ADCA, when used conjointly with another blowing agent, must be used in an amount of at least 60% by weight of the combined amount of the blowing agents to obtain an open cell sheet of good air permeability.

What we claim is:

1. A foamable composition of vinyl chloride polymers for preparation of an open cell sheet, comprising:
   (i) 100 parts by weight of a vinyl chloride
   (ii) 30 to 150 parts by weight of a plasticizer;
   (iii) 1 to 8 parts by weight of a synthetic hydrocarbon wax prepared by a process selected from the group consisting of depolymerization of polyethylene, polymerization of ethylene and the Fischer-Tropsch synthesis of coal gas, said wax having a molecular weight of 1,500 to 7,000, a softening point of 90° to 135° C. and an average particle size of 10 to 100 μm,
   (iv) 1 to 5 parts by weight of an alkali metal-zinc stabilizer and
   (v) 2 to 10 parts by weight of a decomposable organic blowing agent containing at least 60% by weight of azodicarbonamide.

2. A foamable composition as defined in claim 1 wherein the vinyl chloride polymer (i) is 0.1 to 10 μm in average size.

3. A foamable composition as defined in claim 1 wherein the vinyl chloride polymer (i) is selected from the group consisting of a vinyl chloride homopolymer and a copolymer of vinyl chloride and a different monomer containing at least 80% by weight of vinyl chloride and mixtures thereof.

4. A foamable composition as defined in claim 1 wherein the plasticizer (ii) is used in an amount of 50 to 100 parts by weight per 100 parts by weight of the vinyl chloride polymer.

5. A foamable composition as defined in claim 1 wherein the synthetic hydrocarbon wax (iii) is used in an amount of 3 to 7 parts by weight per 100 parts by weight of the vinyl chloride polymer.

6. A foamable composition as defined in claim 1 wherein the alkali metal-zinc stabilizer (iv) comprises 1 to 7% by weight of an alkali metal, 4 to 12% by weight of zinc and the balance substantially an organic acid residue.

7. A foamable composition as defined in claim 6 wherein the alkali metal-zinc stabilizer (iv) comprises 1.4 to 6% by weight of an alkali metal, 5 to 10% by weight of zinc and the balance substantially an organic acid residue.

8. A foamable composition as defined in claim 1 wherein the alkali metal-zinc stabilizer (iv) is used in an amount of 1.5 to 3.5 parts by weight per 100 parts by weight of the vinyl chloride polymer.

9. A foamable composition as defined in claim 1 wherein the decomposable organic blowing agent (v) is used in an amount of 2.5 to 5 parts by weight per 100 parts by weight of the vinyl chloride polymer.

10. A method of producing an open cell sheet of vinyl chloride polymers comprising the steps of shaping a foamable composition of vinyl chloride polymer into a sheet, the composition comprising:
   (1) 100 parts by weight of a vinyl chloride polymer;
   (ii) 30 to 150 parts by weight of a plasticizer;
   (iii) 1 to 8 parts by weight of a synthetic hydrocarbon wax prepared by a process selected from the group consisting of depolymerization of polyethylene, polymerization of ethylene and the Fischer-Tropsch synthesis of coal gas, and having a molecular weight of 1,500 to 7,000, a softening point of 90° to 135° C. and an average particle size of 10 to 100 μm;
   (iv) 1 to 5 parts by weight of an alkali metal-zinc stabilizer and
   (v) 2 to 10 parts by weight of a decomposable organic blowing agent containing at least 60% by weight azodicarbonamide, and heating the resulting sheet at a temperature not lower than the temperature at which the blowing agent undergoes decomposition in the sheet.

11. A method as defined in claim 10 wherein the shaping step is performed by applying the foamable composition to a base substrate in the form of a uniform coating.

12. A method as defined in claim 10 wherein the heating temperature is 150° to 250° C.

13. A method as defined in claim 12 wherein the heating temperature is 180° to 230° C.

* * * * *